(12) United States Patent
Kishi et al.

(10) Patent No.: US 7,432,704 B2
(45) Date of Patent: Oct. 7, 2008

(54) INDUCTOR-TYPE RESOLVER

(75) Inventors: Sakae Kishi, Siga (JP); Kazuhiro Makiuchi, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 0 days.

(21) Appl. No.: 11/423,296

(22) Filed: Jun. 9, 2006

(65) Prior Publication Data

US 2006/0279277 A1    Dec. 14, 2006

(30) Foreign Application Priority Data

Jun. 9, 2005   (JP) .............................. 2005-169952

(51) Int. Cl.
*G01B 7/30* (2006.01)
*H02K 23/22* (2006.01)

(52) U.S. Cl. ............................ 324/207.25; 324/207.17; 310/168; 310/186

(58) Field of Classification Search ............ 324/207.17, 324/207.25; 310/68 B, 168; 318/661, 186
See application file for complete search history.

(56) References Cited

U.S. PATENT DOCUMENTS 4,712,106 A * 12/1987 McNally ................. 340/870.32
6,020,737 A * 2/2000 Wyss ....................... 324/207.25
2003/0074799 A1 * 4/2003 Nakano et al. ................. 33/1 N
2004/0066184 A1 * 4/2004 Kobayashi et al. ...... 324/207.12

FOREIGN PATENT DOCUMENTS

| JP | 60-026454 | 2/1985 |
| JP | 05-252711 | 9/1993 |
| JP | 2000-316266 | 11/2000 |
| JP | 2003042805 A * | 2/2003 |

* cited by examiner

*Primary Examiner*—Patrick Assouad
*Assistant Examiner*—David M. Schindler
(74) *Attorney, Agent, or Firm*—Rankin, Hill & Clark LLP

(57) ABSTRACT

An inductor-type resolver capable of reducing a residual voltage by providing a correction winding inside the resolver is provided. Two magnetic pole portions 11 and 15 include winding portions W11 and W12, respectively, which constitute a first signal detecting winding W1. Two magnetic pole portions 13 and 17 include winding portions W21 and W23, respectively, which constitute a second signal detecting winding W2. A remaining magnetic pole portion W19 includes a correction winding W3 for obtaining a correction voltage used for reducing the residual voltage.

12 Claims, 4 Drawing Sheets

INDUCTOR-TYPE RESOLVER

BACKGROUND OF THE INVENTION

The present invention relates to an inductor-type resolver capable of reducing a residual voltage.

Japanese Patent Application Laid-Open Publication No. 26454/1985 discloses in FIGS. 3 and 4 thereof a technique in which by changing one or more of magnetic resistance and conductivity between a plurality of correction windings provided outside the inductor-type resolver, a residual voltage that appears in a COS voltage or a SIN voltage in the inductor-type resolver is eliminated.

When the correction windings are provided outside the resolver, as in the inductor-type resolver disclosed in Japanese Patent Application Laid-Open Publication No. 26454/1985, dimensions of a system including the resolver may be increased.

SUMMARY OF THE INVENTION

An object of the present invention is to provide an inductor-type resolver in which by providing a correction winding inside the resolver, a residual voltage can be reduced.

Other object of the present invention is to provide an inductor-type resolver that can adjust an amount of reduction of the residual voltage.

An inductor-type resolver includes an inductor-type rotor and a stator. In the present invention, the stator is constituted by a stator iron core including a plurality of magnetic pole portions facing the rotor; first and second signal detecting windings each provided at one or more of the magnetic pole portions selected from among the magnetic pole portions; an exciting winding; and a correction winding. The first signal detecting winding is constituted by winding a winding conductor on the one or more of the magnetic pole portions belonging to a first group. The second signal detecting winding is constituted by winding a winding conductor on the one or more of the magnetic pole portions belonging to a second group and detects a signal having a phase different from a phase of a signal to be detected by the first signal detecting winding. The exciting winding is constituted by winding winding conductors on the at one or more of the magnetic pole portions, and generates a magnetic flux passing through the first and second signal detecting windings through the rotor. The correction winding is constituted by winding a winding conductor on one or more of the magnetic pole portions other than the one or more of the magnetic pole portions belonging to the first and second groups including the exciting winding. The correction winding generates an output voltage used to reduce a residual voltage appearing in an output of the first signal detecting winding or the second signal detecting winding.

In the present invention, the correction winding is provided at the one or more of the magnetic pole portions in the stator. Thus, the need for providing the correction winding outside, as in the prior art, is eliminated. Accordingly, dimensions of the inductor-type resolver including the correction winding can be reduced more than with the prior art. When the magnetic pole portion dedicated to provision of the correction winding is provided, the magnetic pole portions with the first and second signal detecting windings wound thereon cannot be arranged equally. However, it is already known that even if the magnetic pole portions with the first and second signal detecting windings wound thereon are not arranged equally, COS and SIN signals can be obtained. Accordingly, the present invention, which needs the magnetic pole portion dedicated to provision of the correction winding, can be carried out technically.

Specifically, when (2n+1) magnetic pole portions (in which n is a positive integer) is provided at the stator iron core, the first signal detecting winding can be constituted by winding winding condutors on n of the (2n+1) magnetic pole portions, respectively. The second signal detecting winding can be constituted by winding winding conductors on n of the (2n+1) magnetic pole portions, respectively. The exciting winding can be constituted by winding winding conductors on the one or more of the (2n+1) magnetic pole portions, respectively. The one or more of the (2n+1) magnetic pole portions include the first signal detecting winding and/or the second signal detecting winding. Then, the correction winding can be constituted by winding a winding conductor on the remaining one of the (2n+1) magnetic pole portions. The correction winding can be used to reduce the residual voltage appearing in an output of the first signal detecting winding or the second signal detecting winding.

In order to reduce the residual voltage using an output voltage of the correction winding, a mechanical position of the magnetic pole portion including the correction winding and the number of turns of the correction winding should be determined in advance so that a phase and an amplitude (or a magnitude) of the output voltage of the correction winding necessary for the detected signal that needs the correction can be obtained. However, a manufacturing error is always generated. Thus, depending on a product, a variation in a reduction rate of the residual voltage may be generated. In order to solve the problem as described above, it is preferable that the impedance adjusting circuit capable of making adjustment on the correction winding is connected across the correction winding, thereby constituting the parallel circuit. When the impedance adjusting circuit as described above is provided, the phase and the magnitude of the voltage necessary for the correction can be adjusted to a certain extent. Occurrence of a great variation in the residual voltage among products can be thereby prevented. Further, a selective connection circuit may be further provided. The selective connection circuit selectively connects the parallel circuit to the first signal detecting winding or the second signal detecting winding that requires the correction, in series. When the selective connection circuit as described above is provided, the signal detection winding that requires the correction can be selected, so that the correction can be made on the selected signal detection winding. The residual voltage thus can be effectively reduced. Preferably, this selective connection circuit is configured so that when the correction is not necessary, the parallel circuit can be made to be brought into an electrically unconnected state.

A first adjustment circuit for adjusting a peak value of the detected signal may be connected across the first signal detecting winding. Further, a second adjusting circuit for adjusting a peak value of the detected signal may be connected across the second signal detecting winding. In this case, it is preferable that the selective connection circuit is configured so that selection can be made between connection of the parallel circuit to the first signal detecting winding or the second signal detecting winding in series and nonconnection of the parallel circuit to the first signal detecting winding nor the second signal detecting winding. With this arrangement, the residual voltage can also be reduced just by adjustment using the first adjustment circuit or the second adjustment circuit, without using the correction winding. Countermeasures against reduction of the residual voltage according to a situation thus can be taken.

Preferably, the impedance adjusting circuit is constituted by including at least one of a variable resistance, a variable capacitor, and a variable inductor. By including such variable elements, adjustment of the reduction rate of the residual voltage can be easily made.

According to the present invention, the dimensions of the inductor-type resolver including the correction winding can be reduced more than with the prior art. Further, by providing the impedance adjusting circuit, occurrence of a variation in the reduction rate of the residual voltage among products can be prevented.

DETAILED DESCRIPTION OF THE PREFERRED EMBODIMENT

Figure 1:
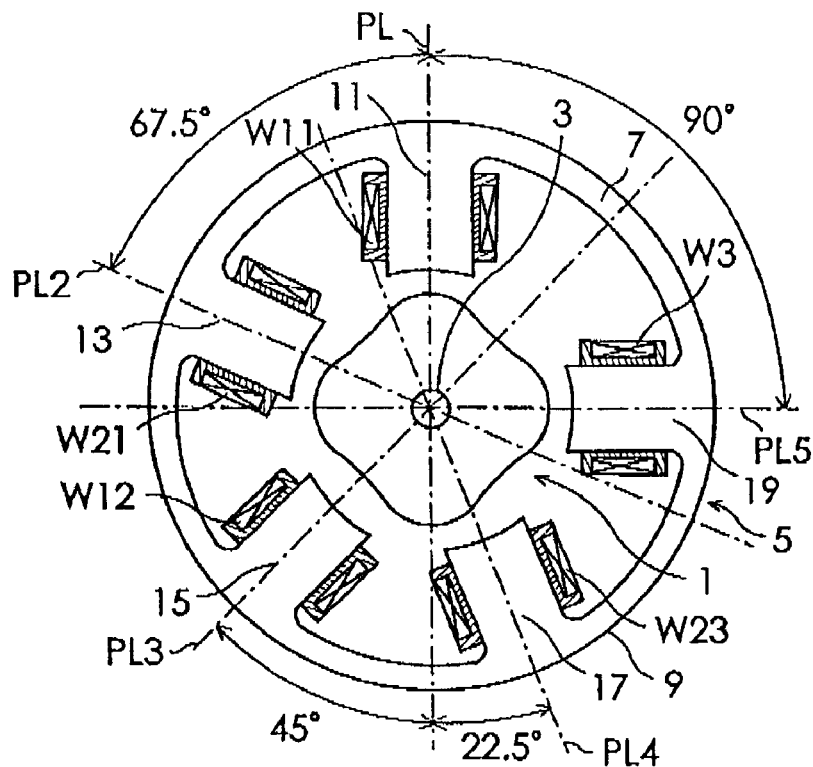
FIG. 1 is a diagram schematically showing a configuration of an embodiment of the present invention applied to an inductor-type 4× resolver.
Figure 2:
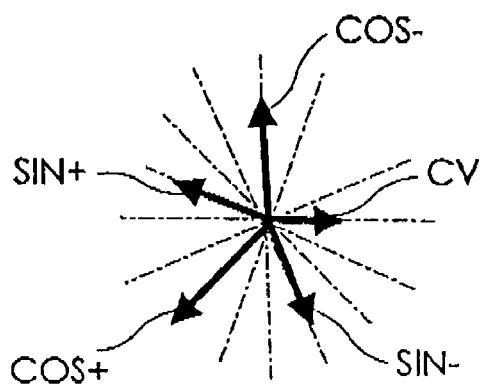
FIG. 2 is a vector diagram showing respective outputs of first and second signal detecting windings and a correction winding.
Figure 3:
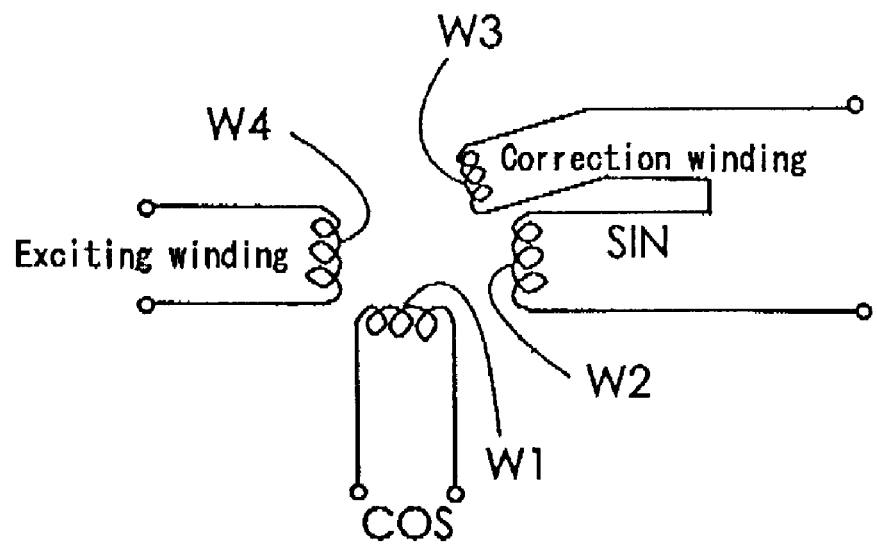
FIG. 3 is a diagram showing a circuit configuration of a circuit constituted by the first and second signal detecting windings, correction winding, and an exciting winding.

FIG. 1 is a diagram schematically showing a configuration of an embodiment of the present invention applied to an inductor-type 4× resolver. FIG. 2 is a vector diagram showing respective outputs of first and second signal detecting windings W1 and W2 and a correction winding W3, which will be described later. FIG. 3 shows a circuit configuration of a circuit constituted by these windings W1 to W3 and an exciting winding W4.

Referring to FIG. 1, a member indicated by reference numeral 1 is a rotor formed of a magnetic material that functions as an inductor. The rotor 1 is fixed to a rotating shaft 3. The rotor 1 has a quatrefoil shape of which a diameter changes periodically four times per rotation as a function of a mechanical angle. A member indicated by reference numeral 5 is a stator. Inside the stator, the rotor 1 rotates. The stator 5 has a stator ion core 7 constituted by laminating a plurality of steel plates. The stator iron core 7 includes an annular yoke 9 and five magnetic pole portions 11, 13, 15, 17, and 19 arranged in an inner periphery of the yoke 9. The five magnetic pole portions 11, 13, 15, 17, and 19 are integral with the yoke 9. The five magnetic pole portions 11, 13, 15, 17, and 19 are arranged unequally as follows: a virtual center line PL1 that extends in a diameter direction, passing through the center of the magnetic pole portion 11 and then the center of the rotating shaft 3, passes through mechanical positions of 0 degrees and 180 degrees, respectively. An angle formed between a virtual center line PL2 that passes through the center of the magnetic pole portion 13 and the virtual center line PL1 that passes through the center of the magnetic pole portion 11 is set to 67.5°. An angle formed between a virtual center line PL3 that passes through the center of the magnetic pole portion 15 and the virtual center line PL1 (at the mechanical position of 180 degrees) is set to 45°, while an angle formed between the virtual center line PL4 that passes through the center of the magnetic pole portion 17 and the virtual center line PL1 (at the mechanical position of 180°) is set to 22.5°. An angle formed between a virtual center line PL5 that passes through the center of the magnetic pole portion 19 and the virtual center line PL1 is set to 90°. The five magnetic pole portions 11, 13, 15, 17 and 19 are arranged unequally so that the angles between the two adjacent magnetic pole portions are different, as described above.

The two magnetic pole portions 11 and 15 among the five magnetic pole portions 11, 13, 15, 17, and 19 include winding portions W11 and W12 respectively. The two winding portions 11 and 15 constitute the first signal detecting winding W1 for detecting a signal used for obtaining a COS signal. Each of the winding portions W11 and W12 is constituted by winding an insulation-coated winding conductor around a bobbin mounted on the magnetic pole portions 11 and 15, respectively. The winding portions W11 and W12 are electrically connected in series. The two magnetic pole portions 13 and 17 among the five magnetic pole portions 11, 13, 15, 17 and 19 include winding portions W21 and W23. The winding portions W21 and W23 constitute the second signal detecting winding W2 for detecting a signal used for obtaining a SIN signal. Each of the winding portions W21 and W23 is constituted by winding an insulation-coated winding conductor around a bobbin mounted on the magnetic pole portions 13 and 17, respectively. The winding portions W21 and W23 are electrically connected in series. The magnetic pole portion 19 includes the correction winding W3 for obtaining a correction voltage CV used for correction for reducing a residual voltage. The correction winding W3 is also constituted by winding an insulation-coated winding conductor around a bobbin mounted on the magnetic pole portion 19.

It is known in Japanese Patent Application Laid-Open Publication No. 316266/2000 that the COS signal and the SIN signal are respectively obtained from the first signal detecting winding W1 and the second signal detecting winding W2 provided at the four magnetic pole portions 11, 13, 15 and 17 arranged as described above. When a 2× resolver is constituted, the first signal detecting winding W1 and the second signal detecting winding W2 may be provided at just one magnetic pole portion, respectively. Accordingly, at least three magnetic pole portions suffice for carrying out the present invention. An exciting winding W4, though now shown, is constituted by four winding portions provided at the four magnetic pole portions 11, 13, 15, and 17, respectively. Provision of the exciting winding W4 together with the signal detecting winding at the magnetic pole portion is already known. Thus, a description about it will be omitted.

In this embodiment, the magnetic pole portion 19 dedicated to provision of the correction winding W3 is provided in a free space in the yoke 9. The correction winding W3 is thereby arranged in the resolver. In terms of a circuit, in order to reduce the residual voltage that appears in an output of the second signal detecting winding W2 for detecting the SIN signal, for example, the correction winding W3 is connected to the second signal detecting winding W2 in series, as shown in FIG. 3. Then, by a carrying out a test in advance, the position of the magnetic pole portion 19 including the correction winding W3 and the number of turns of the correction winding W3 are set so that the residual voltage can be reduced.

Figure 4:
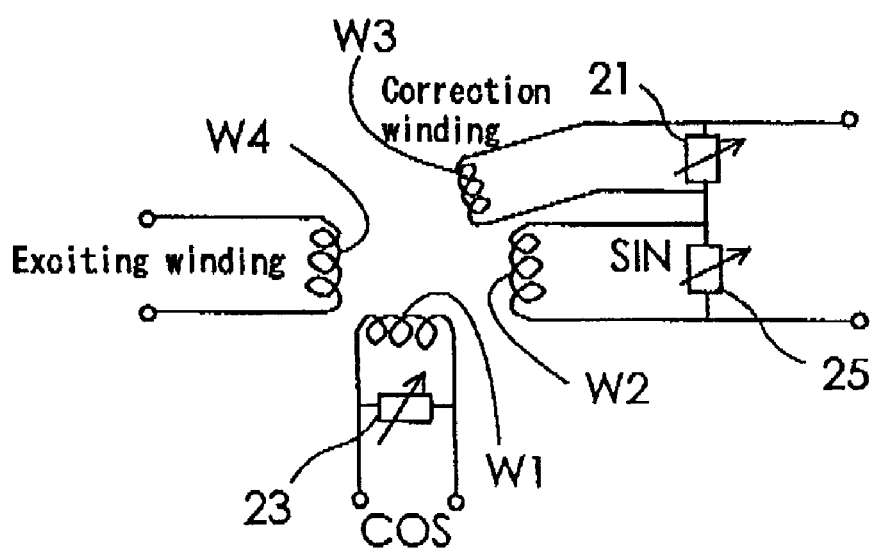
FIG. 4 is a diagram showing a variation example of the circuit configuration that uses the correction winding.

However, it is actually difficult to remove a residual error that is generated due to a manufacturing error or the like by setting the position of the correction winding and the number of the turns of the correction winding in advance based on the test carried out in advance. Then, in such a case, it is preferable to connect an impedance adjusting circuit 21 that can make adjustment on the correction winding W3, as shown in FIG. 4, thereby constituting a parallel circuit. The impedance adjusting circuit 21 is constituted by including at least one of a variable resistance, a variable capacitor, and a variable inductor. In order to constitute the impedance adjusting circuit 21 to be compact, the impedance adjusting circuit should be constituted by an LC circuit or an LCR circuit that includes the variable resistance as a variable element. When the impedance adjusting circuit 21 is provided, a phase and a magnitude of the voltage CV necessary for the correction can be adjusted to a certain extent. For this reason, occurrence of a large variation in the residual voltage among products can be prevented.

In an example in FIG. 4, a first adjustment circuit 23 for adjusting a peak value of the detected signal is connected across the first signal detecting winding W1. A second adjustment circuit 25 for adjusting a peak value of the detected signal is connected across the second signal detecting winding W2 as well. Like the impedance adjusting circuit 21, each of the first adjustment circuit 23 and the second adjustment circuit 25 is also constituted from the LC circuit or the LCR circuit including at least one of the variable resistance, variable capacitor, and variable inductor.

Figure 5:
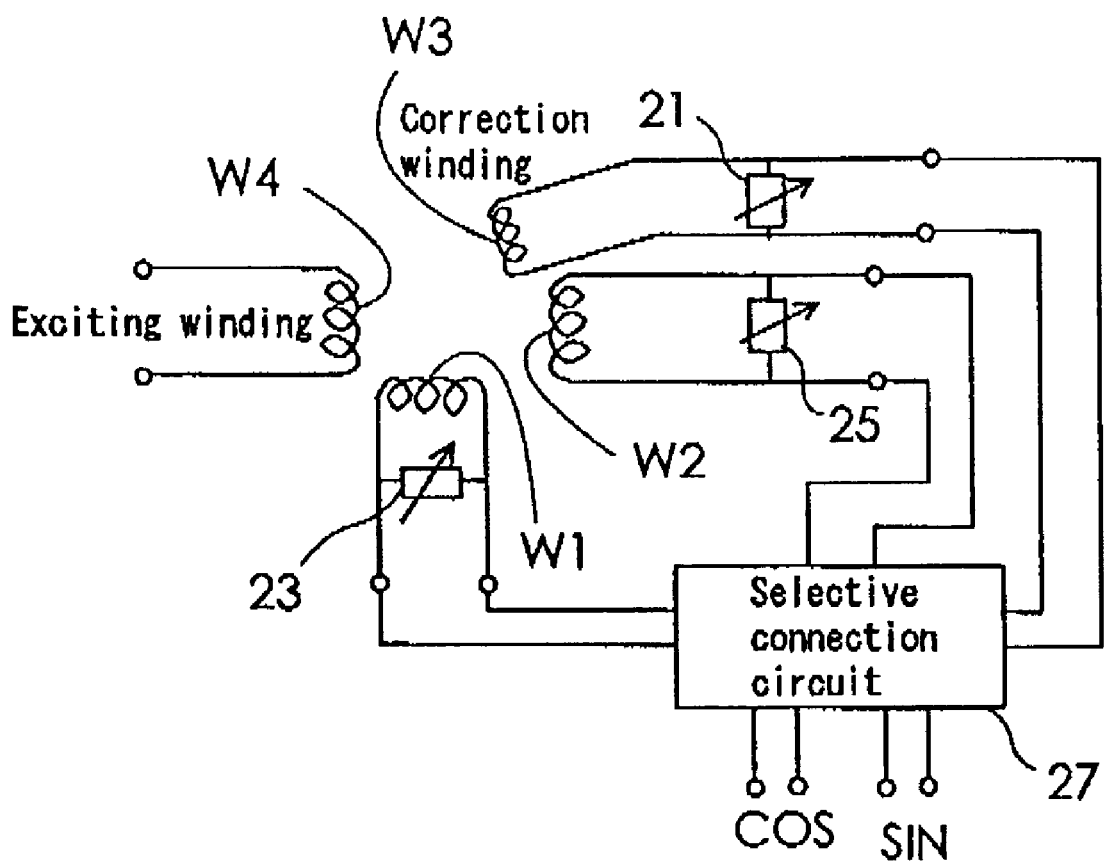
FIG. 5 is a diagram showing other variation example of the circuit configuration that uses the correction winding.

FIG. 5 shows a circuit configuration according to a variation of the embodiment in which a selective connection circuit 27 is provided that selectively connects the correction winding W3 to the first signal detecting winding W1 or the second signal detecting winding W2 that requires the correction, in series. When the selective connection circuit 27 is provided, the signal detecting winding that requires the connection can be selected, so that the correction can be made on the selected signal detection winding. The residual voltage thus can be effectively reduced. The selective connection circuit 27 is constituted so that selection between connection of the parallel circuit constituted by the correction winding W3 and the impedance adjusting circuit 21 to the first signal detecting winding W1 or the second signal detecting winding W2 in series and nonconnection of this parallel circuit to the first signal detecting winding W1 nor the second signal detecting winding W2 is made. As a result, the residual voltage can also be reduced just by adjustment using the first adjustment circuit 23 or the second adjustment circuit 25, without using the correction winding W3. Countermeasures against reduction of the residual voltage according to a situation thus can be taken. The circuit configuration of the selective connection circuit 27 is arbitrary.

Figure 6A:
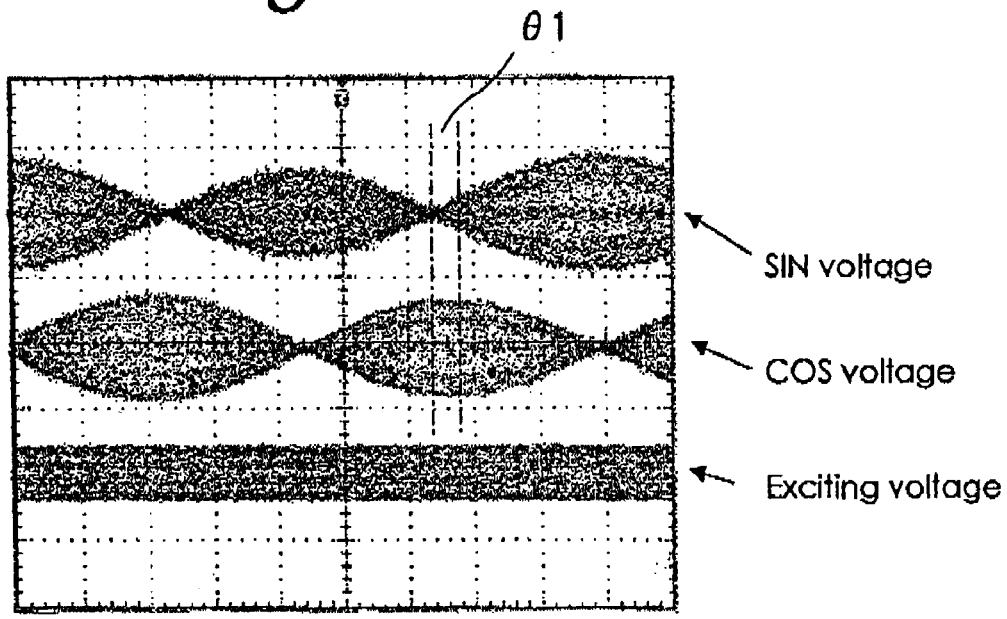
FIG. 6(A) is a graph used for explaining an error generated when correction is not made.
Figure 6B:
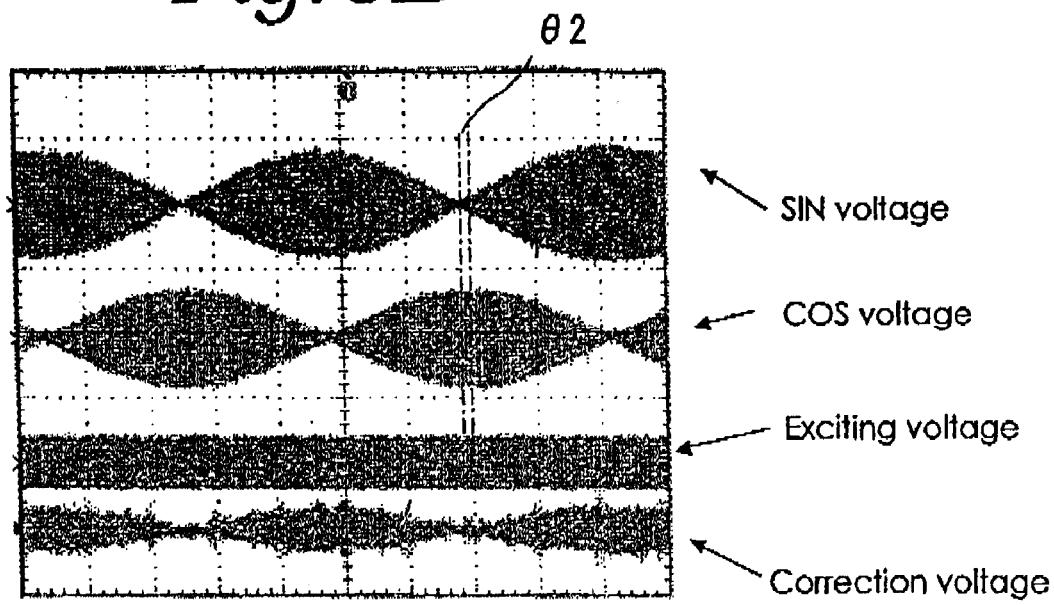
FIG. 6(B) is a graph used for explaining reduction of the error when the correction is made.

FIG. 6(A) schematically shows a relationship among the SIN signal (SIN voltage), COS signal (COS voltage), and an exciting voltage when the correction winding W3 is not provided for correction in the 4× resolver. It is ideal that a zero point (cross point) of the SIN signal (SIN voltage) matches with a peak position of the COS signal (COS voltage) to generate a phase difference of 90° between both of the SIN and COS voltages. A phase difference θ1 or an error in an example in FIG. 6(A) is generated due to the residual voltage. In this example, the error of approximately 10° is generated. FIG. 6(B) shows an example of a result of reduction of the residual voltage by using the output voltage of the correction winding W3 and the impedance adjusting circuit 21. In the example in FIG. 6(B), the phase difference θ1 or the error is reduced to approximately 3°. By carrying out the correction as described above, the residual voltage can be reduced.

While the embodiment described above shows the example where the present invention has been applied to the 4× resolver, the present invention can be of course applied to the 2× resolver, an 8× resolver, and the like.

While a preferred embodiment of the invention has been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. An inductor-type resolver comprising:
an inductor-type rotor; and
a stator;
the stator comprising:
a stator iron core including a plurality of magnetic pole portions facing the rotor, wherein the plurality of magnetic pole portions include a first and a second group;
a first signal detecting winding including a winding conductor on one or more of the magnetic pole portions belonging to the first group, the first signal detecting winding detecting a first signal;
a second signal detecting winding including a winding conductor on one or more of the magnetic pole portions belonging to the second group, the second signal detecting winding detecting a second signal having a phase different from a phase of the first signal;
an exciting winding including winding conductors on one or more of the magnetic pole portions, the exciting winding generating a magnetic flux passing through the first and second signal detecting windings through the rotor; and
a correction winding including a winding conductor on one or more of the magnetic pole portions other than the one or more of the magnetic pole portions belonging to the exciting winding or the first and second groups, the correction winding being configured to reduce a residual voltage appearing in a one of an output of the first signal detecting winding and the second signal detecting winding.

2. The inductor-type resolver according to claim 1, further comprising:
a parallel circuit including said correction winding and an impedance adjusting circuit which is capable of making adjustment on an impedance; and
a selective connection circuit selectively connecting the parallel circuit to one of the first signal detecting winding and the second signal detecting winding in series.

3. The inductor-type resolver according to claim 1, further including:
a first adjustment circuit configured to adjust a peak value of the first signal and being connected across the first signal detecting winding;
a second adjustment circuit configured to adjust a peak value of the second signal and being connected across the second signal detecting winding;
a parallel circuit including said correction winding and an impedance adjusting circuit capable of making an adjustment on an impedance; and
a selective connection circuit configured to selectively i) connect the parallel circuit with the first signal detecting winding in series, ii) connect the parallel circuit with the second signal detecting winding in series, and iii) disconnect the parallel circuit from the first signal detecting winding and the second signal detecting winding.

4. The inductor-type resolver according to claim 2, wherein the impedance adjusting circuit comprises at least one of a variable resistance, a variable capacitor, and a variable inductor.

5. An inductor-type resolver comprising:
an inductor-type rotor; and
a stator;
the stator comprising:
a stator iron core including 2n+1 magnetic pole portions facing the rotor, n being a positive integer equal to or larger than one;
a first signal detecting winding including winding conductors on n of the 2n+1 magnetic pole portions, respectively, the first signal detecting winding detecting a first signal;
a second signal detecting winding including winding conductors on n of the 2n+1 magnetic pole portions, respectively, the second signal detecting winding detecting a second signal having a phase different from a phase of the first signal;
an exciting winding including winding conductors on one or more of the 2n+1 magnetic pole portions, respectively, the exciting winding generating a magnetic flux passing through the first and second signal detecting windings through the rotor, the one or more of the 2n+1 magnetic pole portions including at least one of the first signal detecting winding and the second signal detecting winding; and
a correction winding including a winding conductor on a remaining one of the 2n+1 magnetic pole portions, the correction winding being configured to reduce a residual voltage appearing in an output of one of the first signal detecting winding and the second signal detecting winding.

6. The inductor-type resolver according to claim 5, further comprising:
a parallel circuit including said correction winding and an impedance adjusting circuit which is capable of making adjustment on an impedance; and
a selective connection circuit selectively connecting the parallel circuit in series to one of the first signal detecting winding and the second signal detecting winding.

7. The inductor-type resolver according to claim 5, further including:
a first adjustment circuit configured to adjust a peak value of the first signal and being connected across the first signal detecting winding;
a second adjustment circuit configured to adjust a peak value of the second signal and being connected across the second signal detecting winding;
a parallel circuit including a parallel connection of said correction winding with an impedance adjusting circuit, the impedance adjusting circuit capable of making an adjustment on an impedance;
a selective connection circuit configured to selectively i) connect the parallel circuit with the first signal detecting winding in series, ii) connect the parallel circuit with the second signal detecting winding in series, and iii) disconnect the parallel circuit from the first signal detecting winding and the second signal detecting winding.

8. The inductor-type resolver according to claim 6, wherein the impedance adjusting circuit comprises at least one of a variable resistance, a variable capacitor, and a variable inductor.

9. The inductor-type resolver according to claim 1, wherein said plurality of magnetic pole portions are disposed on said stator unequally so that angles between pairs of adjacent magnetic pole portions are different from angles between other pairs of adjacent magnetic pole portions.

10. The inductor-type resolver according to claim 9, wherein:
said stator defines a virtual center line extending in a diameter direction relative to the stator passing through mechanical positions of 0 degrees and 180 degrees of said stator;
said first signal detecting winding is carried on a first pair of magnetic pole portions including a first pole portion being disposed at said virtual center line at said mechanical position of 0 degrees and a second pole portion being offset by 45 degrees from said virtual center line relative to said mechanical position of 180 degrees;
said second signal detecting winding is carried on a second pair of magnetic pole portions including a first pole portion being offset from said virtual center line by 67.5 degrees relative to said mechanical position of 0 degrees and a second pole portion being offset by 22.5 degrees from said virtual center line relative to said mechanical position of 180 degrees; and,
said correction winding is carried on a magnetic pole portion being offset from said virtual center line by 90 degrees relative to said mechanical position of 0 degrees.

11. The inductor-type resolver according to claim 5, wherein said plurality of magnetic pole portions are disposed on said stator unequally so that angles between pairs of adjacent magnetic pole portions are different from angles between other pairs of adjacent magnetic pole portions.

12. The inductor-type resolver according to claim 11, wherein:
said stator defines a virtual center line extending in a diameter direction relative to the stator passing through mechanical positions of 0 degrees and 180 degrees of said stator;
said first signal detecting winding is carried on a first pair of magnetic pole portions including a first pole portion being disposed at said virtual center line at said mechanical position of 0 degrees and a second pole portion being offset by 45 degrees from said virtual center line relative to said mechanical position of 180 degrees;
said second signal detecting winding is carried on a second pair of magnetic pole portions including a first pole portion being offset from said virtual center line by 67.5 degrees relative to said mechanical position of 0 degrees and a second pole portion being offset by 22.5 degrees from said virtual center line relative to said mechanical position of 180 degrees; and,
said correction winding is carried on a magnetic pole portion being offset from said virtual center line by 90 degrees relative to said mechanical position of 0 degrees.

* * * * *